(12) United States Patent
Smith

(10) Patent No.: US 7,318,472 B2
(45) Date of Patent: Jan. 15, 2008

(54) IN SITU FILTER CONSTRUCTION

(75) Inventor: Kevin W. Smith, Houston, TX (US)

(73) Assignee: Total Separation Solutions, LLC, Houston, TX (US)

( * ) Notice: Subject to any disclaimer, the term of this patent is extended or adjusted under 35 U.S.C. 154(b) by 157 days.

(21) Appl. No.: 11/344,803

(22) Filed: Feb. 1, 2006

(65) Prior Publication Data

US 2006/0192039 A1   Aug. 31, 2006

Related U.S. Application Data

(60) Provisional application No. 60/649,632, filed on Feb. 2, 2005.

(51) Int. Cl.
*E21B 43/02* (2006.01)

(52) U.S. Cl. .................. 166/276; 166/280.2; 166/300; 166/302

(58) Field of Classification Search ............... None
See application file for complete search history.

(56) References Cited

U.S. PATENT DOCUMENTS

| | | |
|---|---|---|
| 3,279,541 A | 10/1966 | Knox et al. |
| 3,857,444 A | 12/1974 | Copeland |
| 3,929,191 A | 12/1975 | Graham et al. |
| 3,930,539 A | 1/1976 | Curtis |
| 4,057,107 A | 11/1977 | Pusch et al. |
| 4,106,970 A | 8/1978 | Torbet et al. |
| 4,178,993 A | 12/1979 | Richardson et al. |
| 4,219,083 A | 8/1980 | Richardson et al. |
| 4,336,842 A | 6/1982 | Graham et al. |
| 4,375,441 A | 3/1983 | Adams et al. |
| 4,399,868 A | 8/1983 | Richardson et al. |
| 4,428,427 A | 1/1984 | Friedman |
| 4,518,039 A | 5/1985 | Graham et al. |
| 4,585,064 A | 4/1986 | Graham et al. |
| 4,597,991 A | 7/1986 | Graham et al. |
| 4,755,230 A | 7/1988 | Ashton et al. |
| 5,120,935 A | 6/1992 | Nenninger |
| 5,128,390 A | 7/1992 | Murphey et al. |
| 5,238,736 A | 8/1993 | Tseng et al. |
| 5,247,994 A | 9/1993 | Nenninger |
| 5,339,895 A | 8/1994 | Arterbury et al. |
| 5,377,750 A | 1/1995 | Arterbury et al. |
| 5,381,864 A | 1/1995 | Nguyen et al. |
| 5,420,174 A | 5/1995 | Dewprashad |
| 5,422,183 A | 6/1995 | Sinclair et al. |
| 5,457,152 A | 10/1995 | Gaa et al. |
| 5,492,178 A | 2/1996 | Nguyen et al. |
| 5,494,629 A | 2/1996 | Gorden et al. |
| 5,501,274 A | 3/1996 | Nguyen et al. |
| 5,551,513 A | 9/1996 | Surles et al. |
| 5,604,184 A | 2/1997 | Ellis et al. |
| 5,663,123 A * | 9/1997 | Goodhue et al. ........... 507/225 |
| 5,833,001 A | 11/1998 | Song et al. |
| 5,901,789 A | 5/1999 | Donnelly et al. |
| 5,955,144 A | 9/1999 | Sinclair et al. |
| 6,030,558 A | 2/2000 | Smith et al. |
| 6,328,104 B1 | 12/2001 | Graue |
| 6,372,678 B1 | 4/2002 | Youngman et al. |

(Continued)

*Primary Examiner*—Zakiya W. Bates
(74) *Attorney, Agent, or Firm*—William L. Krayer

(57) ABSTRACT

A permeable mass is constructed downhole in a well by placing thermoplastic particulates downhole and fusing them together by heating or solvating.

19 Claims, 1 Drawing Sheet

U.S. PATENT DOCUMENTS 6,399,188 B1  6/2002   Smith et al.
6,632,527 B1  10/2003  McDaniel et al.
6,708,762 B2  3/2004   Haugen et al.

* cited by examiner

IN SITU FILTER CONSTRUCTION

RELATED APPLICATION

This application claims the full benefit of Provisional Application 60/649,632 filed Feb. 2, 2005.

TECHNICAL FIELD

A permeable mass is constructed below the surface of the earth, in a space in or near a wellbore where hydrocarbons are caused to flow from a hydrocarbon-producing formation into the wellbore for transport to the earth's surface. The permeable mass is constructed by placing thermoplastic particulate synthetic materials in the space, and causing them to fuse and connect at their points of contact. Placement may be accomplished in a manner similar to the placement of a gravel pack. Fusion is caused by conducting an exothermic reaction in the voids between them, by thermal energy from an electric heater, a catalytic heater, through the use of heated brines, heated heavy brines, heated hydrocarbons, or other fluids heated before injecting, or by the introduction of a solvent to soften or partially dissolve the particles at the points of contact. In hydrocarbon production, the permeable mass may be used in place of a gravel pack, to consolidate formation sand, or simply to filter the recovered hydrocarbons.

BACKGROUND OF THE INVENTION

It is commonly desired to filter reservoir fluids as they are removed from underground formations. Filtration will remove particles of rock, proppants such as sand and other hard particulates deliberately introduced to the formation to assure the stability of the fissures created by fracturing, mud and the like. Underground filtration simplifies handling of the produced oil on the surface. Gravel packs are commonly used to filter downhole, in a process also known as sand control—controlling formation sand. A gravel pack is comprised of loose sand placed around the wellbore. That is, while the operator intends for the sand to reside in a compact mass, the mass is not rigid and the grains are not interconnected—they are free to move. Marginal or inferior quality gravel pack sand will contain too many fines, which clog the interstices, or will be multicrystalline, leading to crumbling and the generation of fines. Ideal gravel pack sand is spherical, but may not be available since most proppants are mined from naturally occurring deposits. Irregularly shaped grains, and wide ranges of size , also present difficulties to the operator.

The technology of expandable sand screens has also become well known in the art. See, for example, "Expandable sand screen technology increases production," by Paul Metcalfe, World Oil, February 2000, pp 1-2, and "Using Expandable Sand Screens in Unconsolidated Formations" by Kevin McMillin, available on the internet from the Oil & Gas Journal under current petroleum, power and energy news technology. Metcalfe estimates that 40% of the world's reservoirs require sand control.

Fused or sintered filters have been devised, typically as a preformed hollow cylinder, for lowering into a well. Downhole filters prior to the present invention have been limited in their size, since the well casing is occupied by rods and must permit the passage of various devices including drill bits. For examples of pre-constructed downhole filters, see Scott, U.S. Pat. No. 5,656,176, describing a curable resin coated particulate that will form chemical bonds at contact points with other similar particulates, the particulates being formed into a well liner. Spherical particles are also said to be formed into preformed shapes designated as tubular sand screens, in Arterbury et al U.S. Pat. Nos. 5,377,750 and 5,339,895, and Nguyen et al U.S. Pat. No. 5,492,178.

The reader may also be interested in Youngman et al U.S. Pat. No. 6,372,678, which describes a ceramic proppant having an outer cured resin designed to fracture under the stress of a producing formation and an inner partially cured resin designed to cure when it is exposed to the elevated temperature of the formation; the authors say the adjacent particles are bonded into a permeable mass. Similar so-called self-consolidation particles are described by Sinclair et al U.S. Pat. No. 5,955,144. An earlier patent, U.S. Pat. No. 4,585,064 to Graham et al discloses a self-consolidating particle comprising a substrate, a substantially cured inner resin and an outer resin which may be more fully cured under the influence of the formation temperature. See also Friedman's U.S. Pat. No. 4,428,427, Graham et al U.S. Pat. Nos. 4,518,039 and 3,929,191, and Sinclair et al U.S. Pat. No. 5,422,183. Generally, these workers utilize unfinished resole, epoxy, phenol-formaldehyde, and other resins which are polymerized or cured when attaining the formation temperature. The consolidated permeable masses they form are usually located within the formation fissures, but may also be used in gravel packs. Copeland, in U.S. Pat. No. 3,857,444, uses a solvent along with the resin-coated particulate, but nevertheless relies on chemical reactions to create bridges between particles. Smith and Fullerton, in U.S. Pat. Nos. 6,030,558 and 6,399,188, describe a technique for making porous plastic products. The preferred starting materials are rapid water quenched micropellets made of polyethylene, which are fused together at a temperature of 320° F. The micropellets are diced underwater from an extrudate typically having a diameter of ⅛ inch, and are characterized by Smith and Fullerton as non-spherical.

Thermal energy has been introduced to wellbores for various purposes. Song et al, in U.S. Pat. No. 5,833,001, use electric heat to cure resin particulates in the form of a downhole sleeve. See also Gondouin U.S. Pat. No. 5,052,482 for techniques for generating steam downhole.

SUMMARY OF THE INVENTION

My invention includes a method of filtering crude oil in a producing well in a formation having fissures through which the crude oil is recovered, comprising placing synthetic polymer particulates in and around the well at the site of the fissures, and causing the particulates to fuse together at their points of contact with each, thereby constructing a filter in situ, and passing the oil through the filter. The thermoplastic polymer particulates are caused to fuse with each other by initiating an exothermic reaction in the interstices between the particulates, or elevating the temperature of the particulates or the fluid between the particles through the use of an electric heater, by steam or a heated liquid such as heated water, brine, heavy brine, liquid hydrocarbon, or any other practical heated liquid, or by solvating the particulates at the points of contact and then removing the solvent, Placement may be accomplished in a manner similar to the placement of a gravel pack, or in any other practical way. My invention may be used for sand control wherever a gravel pack or an expandable sand screen is considered.

My invention also includes a method of making a permeable mass in a well comprising placing thermoplastic particulates in the well so that they contact each other in a substantially compact mass in the well, and causing at least a substantial portion of the particulates to fuse at their points of contact with each other. They can be caused to fuse by thermal energy from an exothermic reaction conducted in the spaces between the particles, by an electric heater, or a catalytic heater, or by a solvent.

One advantage of my invention over a conventional gravel pack can be a virtually guaranteed uniformity of grain size and shape. The particulates I use may be chosen to build a rigid filter, or a porous mass effective for formation sand consolidation, downhole having precisely specified pore sizes and shapes. The synthetic plastic particles will not crack except under extreme pressure, and contain essentially no fines.

Another advantage is that the thermoplastic particulates can have controlled density to achieve a desired buoyancy in the fluids used to place the particulates near the wellbore. The particulates can be chosen based on their mass per unit of volume relative to the carrier fluid and/or the downhole conditions.

The particulates I use may be of various sizes and shapes, and made of various materials which will be explained below.

DETAILED DESCRIPTION OF THE INVENTION

Figure 1:
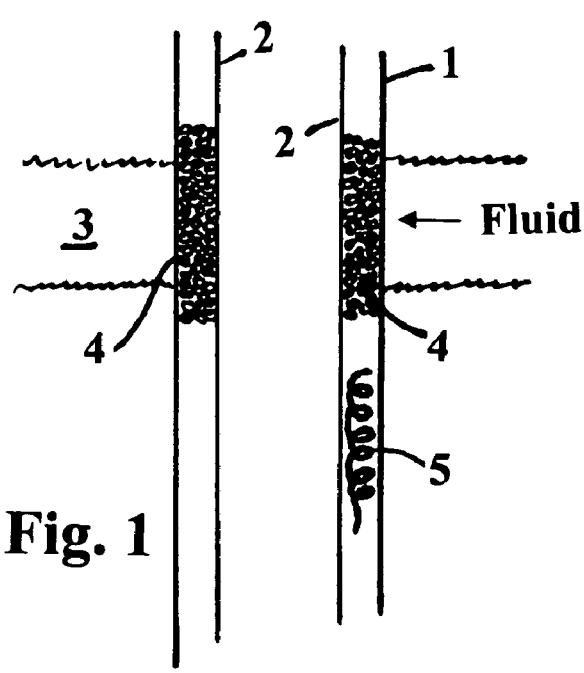
FIG. 1 is a simplified diagram of a permeable mass made by my invention and placed in the wellbore between the piping and the producing formation.

The following definitions and discussions of terms should be observed herein.

Particles or particulates are, when used herein, small pieces of solid thermoplastic synthetic polymer. They may be spheres, beads, rods, pellets, or in any other convenient form, including crushed or otherwise divided or disintegrated larger pieces of formed polymer. The particles or particulates may optionally themselves incorporate or encase smaller particles of inorganic or organic materials such as carbon black, fly ash, ground recycled plastics (broadly, synthetic polymers including thermosets), glass, weighting agents, scrap metals, walnut shells, or finely divided minerals such as calcium carbonate. The outer surface of the particulate should be a synthetic thermoplastic. Fillers, i.e. encased smaller particulates, may be chosen to impart a desired density and, in turn, a desired buoyancy (a particular buoyancy may be desirable for the formation of a compact mass) in the carrier fluid or downhole fluid.

The particulates may assume any convenient three-dimensional shape, bearing in mind that the objective is to make a filter having passages of dimensions effective to filter the solids expected in the particular well. Such common shapes may be chosen to form permeable masses having voids comprising 35-65% of the volume of the completed mass, with pore size being a function of the average particulate size. I do not intend to be limited to a void volume of 35-65%, however; void volumes outside this range may be useful, and for this purpose the practitioner may consider using small particles which will mix and reside in the voids between larger particles, for example, which would also affect the average pore size. The chemical composition of the particulates should be such that at least the outer portions of them will soften under the applied temperatures, merging or fusing with the composition of the adjacent particulate(s), and become hardened and at least semipermanently bridged with the other particulates to form a filter in place, having interstices effective for the task. By semipermanently is meant that the filter thus created will perform satisfactorily during the time of filtration, but when production is completed, it is not necessary that the filter remain permanently in place.

Sphericle particles will usually have a diameter from 0.25 mm to 5 mm; other shapes should also create voids totaling 35-65% of the volume of the mass. Generally, substantially uniform particles of 40 mesh (US Standard Sieve Series—that is, passing a sieve of 40 mesh) will be satisfactory Thermoplastic is used for its generally accepted meaning, including the inference that a particle of thermoplastic synthetic polymer will soften at some temperature above ambient. As is known in the art of synthetic polymers, a thermoplastic composition is one which can be changed in physical form by heating—that is, it will retain the shape it is made to assume at a relatively high temperature, after the temperature is reduced. A classical thermoplastic will have little or no crosslinking since highly or even some moderately crosslinked polymers are difficult or impossible to thermoform, but as used herein, a particle of thermoplastic synthetic polymer may include some crosslinking to give the particle strength and coherence even when subjected to temperatures that will make it soften to the extent necessary for it to stick to other softened particles and form a bridge which remains more or less permanent after the temperature is reduced. Thermoplastics are generally hydrophobic, but I may include a small portion of hydrophilic monomers polymerized in my particles. Thermoplastics include polyethylene and polypropylene of various densities, and other olefinic polymers and copolymers. All of the polymers and copolymers recited as useful in the above-mentioned Arterbury et al U.S. Pat. Nos. 5,377,750 and 5,339,895, as well as the Smith and Fullerton U.S. Pat. Nos. 6,030,558 and 6,399,188 mentioned above, are included in the term thermoplastic as used herein—these include polymers and copolymers of acrylic acid, methacrylic acid, esters of such acids and acrylonitrile; polymethylmethacrylate, polyester (polymerized unsaturated polyesters); urea-formaldehyde; melamine-formaldehyde; polystyrene and various copolymers of styrene with other monounsaturated monomers, and styrene-divinylbenzene. The Arterbury et al U.S. Pat. Nos. 5,377,750 and 5,339,895, and the Smith and Fullerton U.S. Pat. Nos. 6,030,558 and 6,399,188 are incorporated herein in their entireties by reference. Other useful thermoplastice include polysulfones, polyethersulfones, polyarylsulfones, polyarylethersulfones, polycarbonates, polyphenylene oxide, polyphenylene ether, thermoplastic polyurethane, ABS (acrylonitrile-butadiene-styrene), polyvinyl chloride, polyethylene terephthalate and derivatives, cellulose acetate butyrate, polyphenylene sulfide, polyetheretheketone (PEEK), nylon, acetal, polybutylenetherphthalate, ultra high molecular weight polyethylene, high density polyethylene, low density polyethylene, polypropylene, and polymethylpentene. Beads of styrene-divinylbenzene are readily available in commerce, as are various shaped particles and beads of many of the above-mentioned polymers. In one sense, styrene-divinylbenzene beads and some other significantly crosslinked copolymers may not be considered thermoplastic, but they are nevertheless capable of softening and fusing at points of contact. Thus my definition of thermoplastic includes the property of being capable of softening under the influence of thermal energy and fusing at the point of contact with another thermoplastic particulate. Some of the compositions known as thermoplastics may contain very small, residual amounts of unreacted unsaturated groups or other chemically reactive groups which may enter into chemical reactions with other reactive groups in adjacent particles under the conditions of my invention. Any such reactions which strengthen the bridges between particles are viewed as incidental, although sometimes helpful, in my invention, which relies on the softening and physical fusing of contacting points on the particles.

Fusing or fusion is a physical phenomenon—that is, when two thermoplastic particles fuse at their points of contact, they are softened or partially melted by heat energy at least at the points of contact, causing the formation of a bridge or connection from one particle to the other. When the heat source is removed and the temperature reduced, the bridge or other connection remains in a hardened state substantially similar to the hardness of the main bodies of the particles, and the bridges remain rigid. Where this process takes place in a mass of particulates and at a large number of points of contact, each particle is likely to become connected to at least one, usually more, other particles, thus forming a substantially rigid permeable mass of particulates having interstices of a size and shape determined substantially by the sizes and shapes of the particulates.

Persons skilled in the art will recognize that three general types of filter construction and usage are made possible by my invention. These are (1) filters within the wellbore, where the filter is formed into tubular shape contained within the casing or a cylindrical screen designed for the purpose; (2) filters contiguous with the outside of the casing, usually directly in contact with a perforation, and (3) filters constructed outside the casing primarily to reinforce the formation and penetrate the fissures. Filters of the types (1) and (2) may be constructed within fissures in cement surrounding the casing. As various sand and other particles have been deployed in similar locations in the prior practices of the art, persons skilled in the art will understand that carrier fluids may be used, such as water or brine having a viscosity enhanced by a water soluble polymer. See, for example, L. B. Ledlow and C. W. Sauer, "*Recent Design, Placement and Evaluation Techniques Lead to Improved Gravel Pack Performance*", SPE 14162 Society of Petroleum Engineers, 1996. The carrier may include the reactants and the catalysts or initiators for an exothermic reaction to be conducted in the interstices of the mass of particulates.

Placement of the particulates may be accomplished in a manner similar to the placement of a gravel pack, or in any other practical way, and may be considered wherever an expandable sand screen is considered.

Local conditions may influence the timing of placement. Generally, mixing of the synthetic polymer particles with formation sand is to be avoided. Where some formation sand has already been produced, the likelihood of cavity formation is greater than where it has not; also, it is possible that formation sand continues to move toward the wellbore. My invention is particularly useful in areas where unconsolidated formation sands are common, such as in the Gulf of Mexico.

Referring now to FIG. 1, wellbore 1 penetrates the earth and piping 2 has been placed in it in the usual manner. Fluid is produced in the formation and flows through fracture 3. Since it has been determined to be desirable to filter the fluid, thermoplastic particulates 4 are placed by known techniques (such as gravel packing techniques) in the area surrounding the piping contiguous to the fracture. A composition capable of creating an exothermic reaction is located in the spaces between the thermoplastic particulates and is caused to react, increasing the temperature to a point calculated to partially melt the surfaces of the thermoplastic particulates so that they physically fuse at their points of contact. The coherent mass becomes a filter between the fracture 3 and piping 2. Electric heating elements 5 can also or alternatively be situated within or near the thermoplastic particulates to heat the fluid around them.

Figure 2:
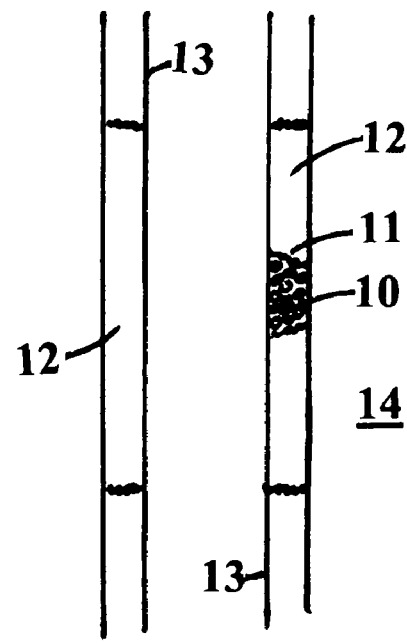
FIG. 2 shows the use of my invention to fill a crevice in cement in the well.

In FIG. 2, the incipient filter, comprising a compact mass 10 of thermoplastic particulates, has been placed in a fissure or crevice 11 of cement lining 12 residing between the piping 13 and the earth formation 14. The compact mass 10 may now be heated by controlled release reactants, by a preheated solution, by a catalytic heater, or any other practical method to cause the particles to partially melt at their points of contact. When the temperature is reduced by terminating the introduction of heat, flushing the area, or otherwise, the permeable mass will have been formed and filtration will begin to take place.

Figure 3:
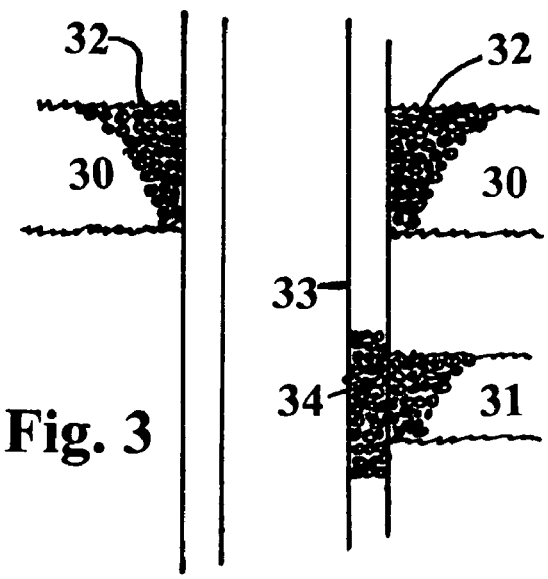
FIG. 3 illustrates placement of permeable masses at the openings of fissures in the formation surrounding the wellbore to prevent or inhibit sloughing of sand and formation particles.

FIG. 3 shows the use of my filter generated in situ for the additional purpose of reducing the incidence of sloughing of sand and other small formation particles. Here, fractures 30 and 31 have begun to erode away at the point where the produced fluid enters the wellbore. Placement of the thermoplastic particulates at this intersection in a compact mass and subsequent fusion of them into a permeable mass 32 will not only result in good filtration of the fluid entering the wellbore but also lining the fracture, which minimizes flow and contact by the fluid with the surfaces of the fractures. This treatment can be readily combined with the technique of FIG. 1—that is, a permeable mass 34 may be made to fill the space between the wellbore and piping 33 while also inhibiting sloughing.

Figure 4:
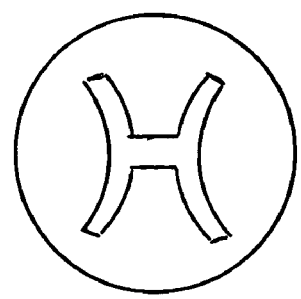
FIG. 4 illustrates an extrusion die profile for making thermoplastic particulates of an alternative shape, designed especially for dicing under water.

FIG. 4 shows a die face for extruding thermoplastic for underwater dicing as described for more ordinary shapes by Smith and Fullerton in U.S. Pat. Nos. 6,030,558 and 6,399, 188. When such an extrusion is diced at thicknesses of, for example, 0.5 mm to 5 mm, preferably about 1 to about 2.5 mm when the diameter of the extrusion is 3 to 5 mm, for example, a three-dimensional shape is obtained which will form permeable masses having tortuous flow paths. Such a shape may also be used where some interlocking is desired and/or where the tendency of rods to form compact layers is to be avoided in order to achieve a more predictable porosity.

Beads or spheres may be made by suspension or emulsion polymerization as is known in the art of synthetic polymers, or by prilling. Suitable pellets are commonly made from polymers and copolymers of olefinic monomers such as ethylene and propylene. These and other thermoplastics in turn can be melted and extruded into rods or differently shaped pellets by shearing or dicing as they emerge from an extrusion die under water. The extrusion die need not be circular, and in fact can have profiles of widely varying shapes, including shapes designed to provide some interlocking. Irregular pieces may be made by crushing larger sheets or chunks of polyacrylates, polymethylmethacrylates, polycarbonates, polyethyleneterephthalates, or polymerized unsaturated polyesters. Any of these may have various degrees of crosslinking to impart interior integrity to the particles, and may include smaller organic or inorganic particles within them, but it is necessary that the surface of the particles be able to soften when heated for fusing to contiguous particles. Unsaturated polyesters are generally highly crosslinked, but for my purposes they may be used so long as the surfaces will combine at the temperature generated by the exothermic reaction.

The temperatures used to cause fusion in situ must be higher than the formation temperature. That is, the softening and melting points of the particulates should be lower than the formation temperature, since the particles will melt and the filter will not perform if it is immediately softened by the formation temperature. Formation temperatures may be considered when calculating the amount of reactants needed to generate the exotherm within the interstices of the incipient permeable mass. However, I do not rely on the formation temperature to accomplish the desired fusion; see Friedman U.S. Pat. No. 4,428,427, Graham U.S. Pat. No. 4,518,039 and others, where formation temperatures are used to initiate a polymerization reaction.

A minimum amount of reactant solution to fill the interstices of a given volume of beads or spherical particulates may be measured for any given size and shape of particulate by compactly filling a known volume container in the laboratory with the particulates and then measuring volume of liquid required to occupy the interstices. This measurement should be considered the minimum, however, because of the difficulty of controlling the flow of fluid. One may calculate the thermal energy expected to be released per unit of volume of the fluid, and then calculate the overall exotherm to be expected. The amount of exotherm (total heat energy released by the reaction in the vicinity of the particulates) should be sufficient to weld substantially all of the points of contact between particulates, but should not be so great as to melt the particles completely, or to cause the bridges to be so large as to reduce the pores to a size smaller than desired, all of which can be determined in a quick lab test. The operator may judge the amount of excess necessary from determinations of cavity size and shape, and the extent of placement in fissures. Where a reactant solution is used, the products of the reactant should be such as can be removed by flushing; likewise an electric heater should not be placed within the permeable mass unless it is to be sacrificed. The total heat energy emitted over time should not be so excessive as to melt the particles or create pores that are too small.

An example of a heat generating fluid is given in Wallender U.S. Pat. No. 4,934,457, comprising HCl, naphtha, and hydrogen peroxide. Acid-base reactions generally are exothermic and may be used. Broadly, any exothermic reaction may be used, bearing in mind that the reaction products should not clog the voids in the incipient filter or other permeable mass.

Thermal energy effective to cause fusion of my incipient permeable mass may be introduced through the use of a heated fluid such as water, brine, heavy brine, or liquid hydrocarbon. The fluid may be heated above the well and introduced as the carrier for the particulates, as part of the carrier, or as a separate liquid designed to displace the carrier and/or other liquids occupying the interstices of the incipient permeable mass, that is, after the substantially compact mass of particulates is formed into a shape and at a location where the creation of a fused permeable mass is deemed to be useful. Some materials which are known to generate heat upon going into solution, such as aluminum chloride, magnesium chloride, calcium chloride, sodium hydroxide, and potassium hydroxide, have been suggested for melting paraffin in wells (see Knox et al U.S. Pat. No. 3,279,541) with various admonitions about handling. Such materials and thermite may be encapsulated and dispersed for controlled release in small quantities at more or less predictable times. Controlled amounts of hydrochloric or phosphoric acid followed by controlled amounts of ammonia may be used to generate heat in desired locations, notably for my purposes in the interstices of the incipient permeable mass. See Curtis U.S. Pat. No. 3,930,539. Other methods of generating heat in a well, generally for the purpose of melting paraffins, have been suggested by Pusch et al in U.S. Pat. No. 4,057,107, Nenninger in U.S. Pat. Nos. 5,120,935 and 5,247,994, and particularly Richardson et al U.S. Pat. No. 4,399,868 and Ashton et al U.S. Pat. No. 4,755,230 the Ashton U.S. Pat. No. 4,755,230 being incorporated herein by reference in its entirety. The Ashton et al '230 patent includes the following description: " . . . nitrogen-forming reactants . . . can include water-soluble amino nitrogen-containing compounds having at least one nitrogen atom to which at least one hydrogen atom is attached and which are capable of reacting with an oxidizing agent to yield nitrogen gas within an aqueous medium. These compounds typically include ammonium salts of certain organic or inorganic acids, amines, nitrogen-linked hydrocarbon-radical substituted homologs of such compounds, so long as they react with an oxidizing agent to produce nitrogen gas and other materials which are liquid and fluid and dissolve in water to form form fluids which are substantially inert relarive to the transmission conduits. Typical of such nitrogen-containing compounds are: ammonium chloride, ammonium nitrate, ammonium nitrite, ammonium acetate, ammonium formate, ethylene diamine, formamide, acetamide, urea, benzyl urea, butyl urea, hydrazine, phenylhydrazine, phenylhydrazine hydrochloride, and the like. Particularly sutiable are the ammonium salts, including ammonium chloride and ammonium formate." As acknowledged by Ashton et al, the same combinations of reactants are listed by Richardson et al in U.S. Pat. No. 4,399,868 along with data and descriptions of how to control the timing of the reactions. Use of such reactants to generate heat for specific purposes in situ is disclosed by Richardson et al in U.S. Pat. No. 4,330,037, along with techniques for delaying the reaction with a buffer, for example, to control the generation of heat over time. Such techniques are well known and may be used in my invention. The Richardson et al U.S. Pat. No. 4,330,037 is also incorporated herein by reference in its entirety. I may use any such combination of an oxidizing agent with a water-soluble nitrogen-containing compound capable of an exothermic reaction, or any other combination of reactants which will generate the necessary thermal energy.

Commercially available rods made of high density polyethylene (HDPE), polypropylene (PP), or any other thermoplastic, and may contain carbon black or other filler in concentrations up to 50% or more. Such rods are made by rapid underwater extrusion followed by shearing or dicing. Immersion of the extrusion and shearing procedures in water ensures rapid cooling and solidification. HDPE can be used in formations having temperatures of up to 180° F. and polypropylene may be used in formations having temperatures of up to 250° F.

In each case, the fusion step must be conducted at a higher temperature. The rods may have a ratio of length to diameter of 1:1 to 10:1 or more.

As alternative to thermal fusing, the particles may be fused together by introducing a solvent into the interstices to cause softening of the surfaces of the particles, which blend together at their points of contact; the solvent is then removed, leaving a permanent bridge at each point of contact. The solvent may be included with the carrier fluid where the solvating action is not so fast as to destroy the particulates before they can be fused.

The invention claimed is:

1. Method of making a permeable mass in a well in a hydrocarbon-producing formation comprising placing thermoplastic particulates in said well in contact each other as a substantially compact mass in said well, said compact mass also defining a void volume, and causing at least a substantial portion of said thermoplastic particulates to fuse at their points of contact with each other, said particulates being caused to fuse by thermal energy from an exothermic reaction of reactants in contact with said particulates.

2. Method of claim 1 wherein said particulates comprise beads, spheres, rods, pellets or irregular pieces of synthetic thermoplastic polymethylmethacrylate, polystyrene, polyacrylonitrile, urea-formaldehyde; melamine-formaldehyde, polycarbonate, polyethylene, polypropylene, thermoplastic copolymers, polyesters, styrene divinylbenzene, polysulfones, polyethersulfones, polyarylsulfones, polyarylethersulfones, polycarbonates, polyphenylene oxide, polyphenylene ether, thermoplastic polyurethane, ABS (acrylonitrile-butadiene-styrene), polyvinyl chloride, polyethylene terephthalate and derivatives, cellulose acetate butyrate, polyphenylene sulfide, polyetheretheketone (PEEK), nylon, acetal, polybutylenetherphthalate, ultra high molecular weight polyethylene, high density polyethylene, low density polyethylene, polypropylene, or polymethylpentene.

3. Method of claim 1 wherein said permeable mass contains a void volume of from 35-65% of the volume of said permeable mass.

4. Method of claim 1 wherein said well is in a hydrocarbon-producing formation having fissures caused by fracturing, and wherein particulates are placed also in said fissures.

5. Method of claim 1 wherein said particulates are caused to fuse by thermal energy from an exothermic reaction of reactants in contact with said particulates comprising a water-soluble nitrogen-containing compound and an oxidizing agent capable of reacting therewith to produce an exothermic reaction.

6. Method of claim 1 wherein said thermoplastic particulates themselves contain smaller particulates encased therein.

7. Method of claim 1 wherein said thermoplastic particulates are placed in said well by carrying them into said well in a fluid carrier and wherein the thermoplastic particulates have a buoyancy in said fluid carrier chosen to facilitate said placing of said thermoplastic particulates.

8. Method of inhibiting sloughing of sand and other materials from the entrances to fissures in a producing well in a formation having fissures through which crude oil is recovered comprising placing synthetic polymer particulates in and around said well, causing said particulates to contact each other at points of contact which also define interstices between them, to form a substantially compact mass at the site of said fissures, causing said particulates to fuse together at their points of contact with each other by initiating an exothermic reaction in the interstices between said particulates, thereby constructing a permeable mass for stabilizing said sand and other materials while permitting fluids to pass through said permeable mass.

9. Method of claim 8 wherein said exothermic reaction is a reaction of a water-soluble nitrogen-containing compound and an oxidizing agent.

10. Method of claim 8 wherein said synthetic polymer particulates comprise polyolefins.

11. Method of claim 8 wherein said permeable mass has a total void volume of 35% to 65% of the volume of said permeable mass.

12. Method of claim 8 wherein said thermoplastic particulates include smaller particulates encased therein, said smaller particulates imparting a density to said thermoplastic particulates at least five percent higher or lower than the density of said thermoplastic particulates without said smaller particulates.

13. A composition of matter useful for creating a permeable mass in a well or in a formation penetrated by a well, said composition comprising a plurality of thermoplastic particulates, said thermoplastic particulates being in a liquid carrier therefor, said liquid carrier including ingredients for inducing an exothermic reaction in said liquid carrier.

14. The composition of claim 13 wherein said particles contain a weighting agent.

15. The composition of claim 13 wherein said ingredients for inducing an exothermic reaction include a water-soluble nitrogen-containing compound and an oxidizing agent.

16. A method of filtering a fluid produced in a well comprising placing the composition of claim 13 in said well and initiating an exothermic reaction in said composition.

17. Method of claim 16 wherein at least one of said ingredients for inducing an exothermic reaction is controlled to react gradually.

18. Method of making a permeable mass in a well in a hydrocarbon-producing formation comprising placing thermoplastic particulates in said well in contact each other as a substantially compact mass in said well, said compact mass also defining a void volume, and causing at least a substantial portion of said thermoplastic particulates to fuse at their points of contact with each other, by contacting them with a solvent.

19. Method of claim 18 wherein said solvent is heated.

* * * * *